United States Patent [19]
Abe

[11] Patent Number: 6,047,089
[45] Date of Patent: Apr. 4, 2000

[54] IMAGE COMPRESSION AND EXPANSION DEVICE

[75] Inventor: Nobuaki Abe, Hokkaido, Japan

[73] Assignee: Asahi Kogaku Kogyo Kabushiki Kaisha, Tokyo, Japan

[21] Appl. No.: 08/919,342

[22] Filed: Aug. 28, 1997

[30] Foreign Application Priority Data

Aug. 29, 1996 [JP] Japan .................................. P08-247254

[51] Int. Cl.[7] .................................. G06K 9/46; G06K 9/36
[52] U.S. Cl. .................................. 382/250; 251/239; 251/233
[58] Field of Search .................................. 382/251, 250, 382/239, 233; 358/430, 433

[56] References Cited

U.S. PATENT DOCUMENTS

| | | | |
|---|---|---|---|
| 5,357,584 | 10/1994 | Yamaoka | 382/251 |
| 5,497,246 | 3/1996 | Abe . | |
| 5,517,327 | 5/1996 | Nakatanti et al. | 382/251 |
| 5,666,209 | 9/1997 | Abe . | |
| 5,850,484 | 12/1998 | Beretta et al. | 382/251 |
| 5,883,979 | 3/1999 | Beretta et al. | 382/251 |

FOREIGN PATENT DOCUMENTS

7135568  11/1994  Japan .

*Primary Examiner*—Phuoc Tran
*Attorney, Agent, or Firm*—Greenblum & Bernstein, P.L.C.

[57] ABSTRACT

The image compression and expansion device comprises a DCT processing unit in which original image data is subjected to a two-dimensional discrete cosine transformation to obtain DCT coefficients, a quantization process unit in which original image data is quantized by a first quantization table to obtain quantized DCT coefficients and a compression processing unit in which the quantized DCT coefficients are encoded to generate compressed image data. The compressed image data and the first quantization tables are recorded in a recording medium. A second quantization table is also stored in the recording medium. The image expansion device has a switch by which one of the first or second quantization table can be selected. An image is, thereby, reproduced from the compressed image data by using the selected type of quantization table.

13 Claims, 9 Drawing Sheets

FIG. 1

FIG. 2A
DEFAULT QUANTIZATION TABLE Qy $$\begin{pmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{pmatrix} \sim QT1$$

FIG. 2B
QUANTIZATION TABLE Qsy FOR HIGH DEF. IMAGE $$\begin{pmatrix} 16 & 12 & 8 & 16 & 24 & 40 & 51 & 61 \\ 11 & 12 & 14 & 19 & 26 & 58 & 60 & 55 \\ 14 & 8 & 16 & 24 & 40 & 57 & 69 & 56 \\ 8 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{pmatrix} \sim QT2$$

FIG. 2C
QUANTIZATION TABLE Qsy FOR MOSAIC $$\begin{pmatrix} 16 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \end{pmatrix} \sim QT3$$

IMAGE COMPRESSION AND EXPANSION DEVICE

BACKGROUND OF THE INVENTION

1. Field of the Invention

The present invention is related to a device which compresses a still image data in accordance with a JPEG (Joint Photographic Expert Group) algorithm and records the compressed image data in a recording medium and, also, to a device which reads the compressed image data from the recording medium and expands the compressed image data to reproduce the still image.

2. Description of the Related Art

A standard algorithm, for the encoding of high resolution images and the transfer of that information through telecommunication transmission channels, has been recommended by the JPEG. In order to enable a large-scale data compression, the baseline process of the JPEG algorithm breaks down the original image data into components on a spatial frequency axis using a two-dimensional DCT process. Thereafter, the data expressed on the spatial frequency axis is quantized by using a quantization table. The quantized data is then encoded using a Huffman table.

The encoded (or compressed) image data can be expanded by carrying out a process, which is the inverse of the compression process described above, so that the original image data can be reproduced. Namely, the compressed image data is decoded, is subjected to a dequantization process, using a quantization table, and is, finally, subjected to a two dimensional inverse discrete transformation, so that the original image data is reproduced.

For example, there are two methods to obtain a mosaic-processed image. Note that a mosaic-process means that a luminance data Y and color difference data Cb and Cr, corresponding to each pixel included in one block forming a part of one frame image, are set to identical data values, respectively, by averaging the data for one block. A first method is that an original image, which has been subjected to the mosaic-process, is compressed and recorded in a recording medium, and then, the compressed image data is subjected to an expansion process. Thus, the mosaic-processed image is reproduced. In a second method, an original image, which has not been subjected to a mosaic-process, is compressed and recorded in a recording medium. Then, this compressed image data is subjected to an expansion process and is, finally, mosaic-processed, so that the mosaic-processed image is reproduced.

According to the first method, however, an image which is not mosaic-processed cannot be reproduced, since the original image has been mosaic-processed. Conversely, the second method should be provided with a step for performing the mosaic-process.

SUMMARY OF THE INVENTION

Accordingly, an object of the present invention is to provide an image compression device which: can reproduce an original image, which has not been subjected to a process such as a mosaic-process; can reproduce an image, which has been subjected to various kinds of processes, without performing an additional, special process; and, further, can record compressed image data, which can then be reproduced, by expanding, by a conventional image expansion device.

According to the present invention, there is provided an image compression device comprising: a two dimensional discrete cosine transformation (two-dimensional DCT) processor, a quantization processor, an encoding processor, a recording processor, a first table recording processor, a second table recording processor and an information recording processor.

The two-dimensional DCT processor processes original image data to obtain a DCT coefficient for each spatial frequency. The quantization processor quantizes the DCT coefficients by a first quantization table, composed of predetermined quantization coefficients, to obtain quantized DCT coefficients. The encoding processor encodes the quantized DCT coefficients to obtain compressed image data. The recording processor records the compressed image data in an image recording area of a recording medium. The first table recording processor records the first quantization table in a first table recording area of the recording medium. The second table recording processor records a second quantization table, which is different from the first quantization table, in a second table recording area of the recording medium. The information recording processor records mode information, implying that the second quantization table is recorded in the recording medium, in an information recording area of the recording medium.

Another object of the present invention is to provide an image expansion device which can expand the compressed image data, recorded by the image compression device, so that an expanded image, subjected to various kinds of processes, can be obtained.

According to the present invention, there is provided an image expansion device which expands compressed image data recorded in a recording medium, in which, also, a first quantization table and a second quantization table are recorded. The device comprises: a decoding processor, a table selecting processor, a dequantization processor and a two dimensional inverse discrete cosine transformation (two-dimensional IDCT) processor.

The decoding processor decodes the compressed image data to obtain quantized DCT coefficients. The table selecting processor can select one of the first and second quantization tables. The dequantization processor dequantizes the quantized DCT coefficients, using one of the quantization tables selected by the table selecting processor, to obtain DCT coefficients. The two-dimensional IDCT processor processes the DCT coefficients to reproduce original image data corresponding to the compressed image data.

Further, according to the present invention, there is provided an image compression and expansion device comprising: a two-dimensional DCT processor, a quantization processor, an encoding processor, a recording processor, a first table recording processor, a second table recording processor, an information recording processor, a decoding processor, a table selecting processor, a dequantization processor and a two-dimensional IDCT processor.

The two-dimensional DCT processor processes original image data to obtain a DCT coefficient for each spatial frequency. The quantization processor quantizes the DCT coefficients by a first quantization table, composed of predetermined quantization coefficients, to obtain quantized DCT coefficients. The encoding processor encodes the quantized DCT coefficients to obtain compressed image data. The recording processor records the compressed image data in an image recording area of a recording medium. The first table recording processor records the first quantization table in a first table recording area of the recording medium. The second table recording processor records a second quantization table, which is different from the first quantization table, in a second table recording area of the recording medium. The information recording processor records mode information, implying that the second quantization table is recorded in the recording medium, in an information recording area of the recording medium. The decoding processor decodes the compressed image data to reproduce the quantized DCT coefficients. The table selecting processor can select one of the first and second quantization tables. The dequantization processor dequantizes the quantized DCT coefficients, using one of the quantization tables selected by the table selecting processor, to reproduce the DCT coefficients. The two dimensional IDCT processor processes the DCT coefficients to reproduce original image data corresponding to the compressed image data.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will be described below with reference to embodiments shown in the drawings.

Figure 1:
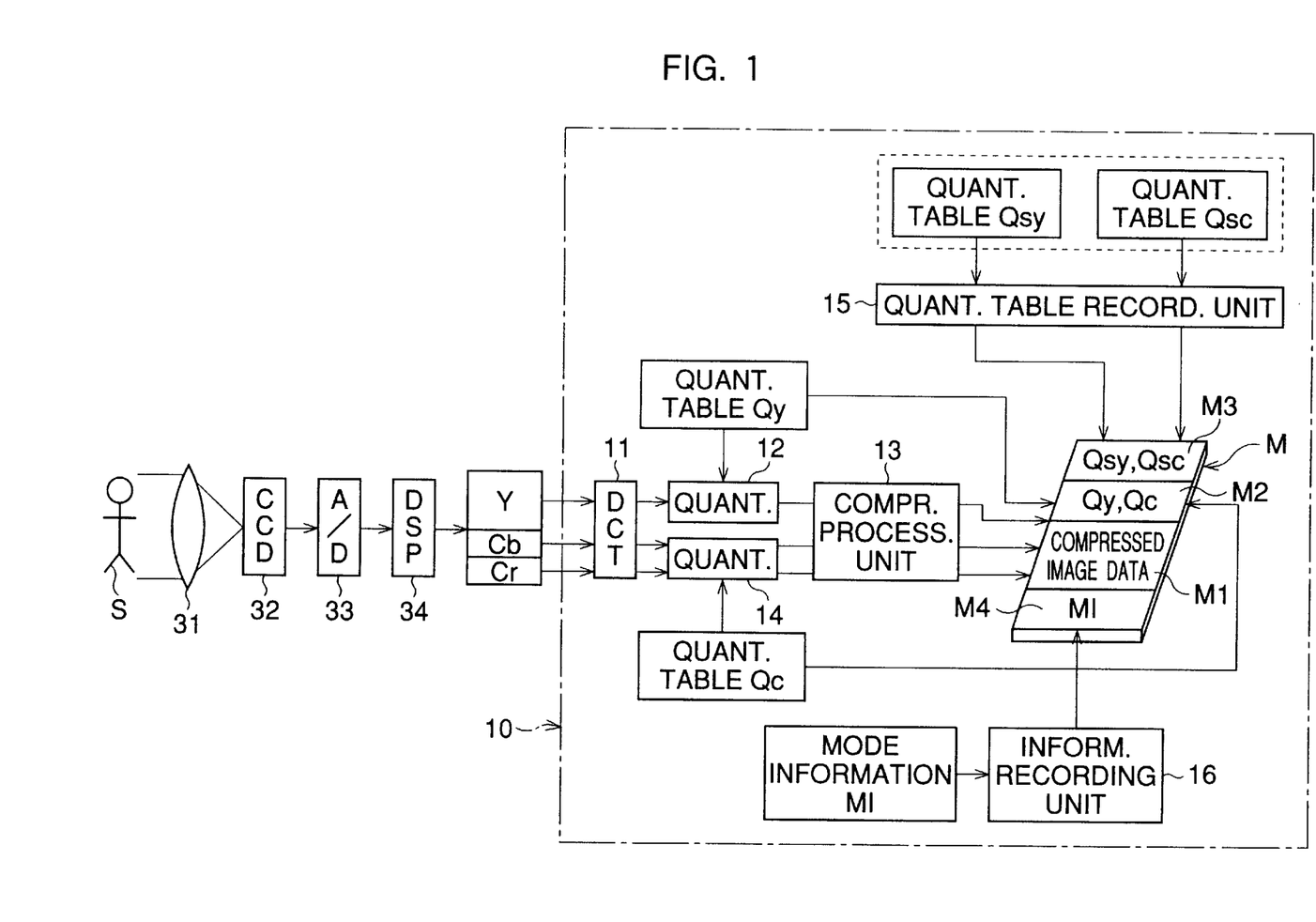
FIG. 1 is a block diagram showing an image compression device of an embodiment of the present invention.

FIG. 1 is a block diagram of an image compression device of an embodiment of the present invention, by which luminance signals (Y data) and color difference signals (Cb data and Cr data), which correspond to an original still image, are compressed according to the JPEG algorithm.

Light reflected from a subject S passes through an imaging optical system 31, such that the reflected light is focused on a CCD (charge coupled device) 32 on which red, green and blue color filter elements (not shown) are provided. The CCD 32 produces charges, which are representative of the quantity of light incident thereon, and outputs an analog signal to an A/D converter 33.

The A/D converter 33 converts the analog signal to a digital image signal, which is inputted to a signal processing unit 34. The signal processing unit 34 converts the color image signal into Y data, Cb data and Cr data, which are inputted to the image processing device 10 to be compressed into JPEG data. In accordance with the present invention, the signal processing unit 34 may be, for example, a conventional digital signal processor (DSP) programmed to convert the image data as described above.

The Y data is subjected to a two-dimensional discrete cosine transformation (two-dimensional DCT), in a DCT processing unit 11, so as to produce a DCT coefficient for each spatial frequency. The DCT coefficients of the Y data are inputted to a first quantization processing unit 12, in which the DCT coefficients are quantized using a first Y-data quantization table Qy, so that quantized DCT coefficients are obtained. The quantized DCT coefficients of the Y data are converted to compressed image data by being Huffman-encoded (or compressed), in a compression processing unit 13, in accordance with the JPEG algorithm. The compressed image data are then recorded in an image recording area M1 of a recording medium M.

In the same way as the above, the Cb data and the Cr data are converted to DCT coefficients, in the DCT processing unit 11, and are then quantized in a second quantization processing unit 14, using a first C-data quantization table Qc, to produce quantized DCT coefficients. The quantized DCT coefficients of the Cb and Cr data are converted to compressed image data by being Huffman-encoded (or compressed), in the compression processing unit 13, in accordance with the JPEG algorithm. The compressed image data are then recorded in the image recording area M1.

The first Y-data quantization table Qy and the first C-data quantization table Qc, used in the first and second quantization units 12 and 14, respectively, are default quantization tables, which are recommended by the JPEG, and are composed of respective predetermined quantization coefficients. These quantization tables Qy and Qc are recorded in a first table recording area M2 of the recording medium M.

In a second table recording area M3 of the recording medium M, a second Y-data quantization table Qsy and a second C-data quantization table Qsc are recorded. The second quantization tables Qsy and Qsc are converted, in a quantization table recording unit 15, to data which conform to a predetermined format. The data are then recorded in the second table recording area M3. The second quantization tables Qsy and Qsc are comprise of quantization coefficients for expanding the compressed image data as a high definition image. The second quantization tables Qsy and Qsc may also, be composed of quantization coefficients for expanding the compressed image data as a mosaic-processed image.

In an information recording area M4 of the recording medium M, mode information MI, implying that the second quantization tables Qsy and Qcy are recorded in the recording medium M, is recorded. Namely, the mode information MI implies that a high definition image can be reproduced or that a mosaic-process image can be reproduced, in accordance with the contents of the second quantization tables Qsy and Qsc. The mode information MI is converted, in an information recording unit 16, to data which conform to a predetermined format. The data are then recorded in the information recording area M4.

Figure 2A:
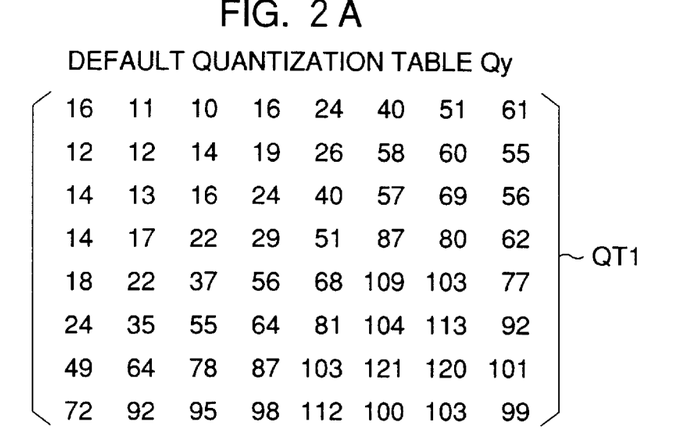
FIG. 2A is a view showing a default quantization table.
Figure 2B:
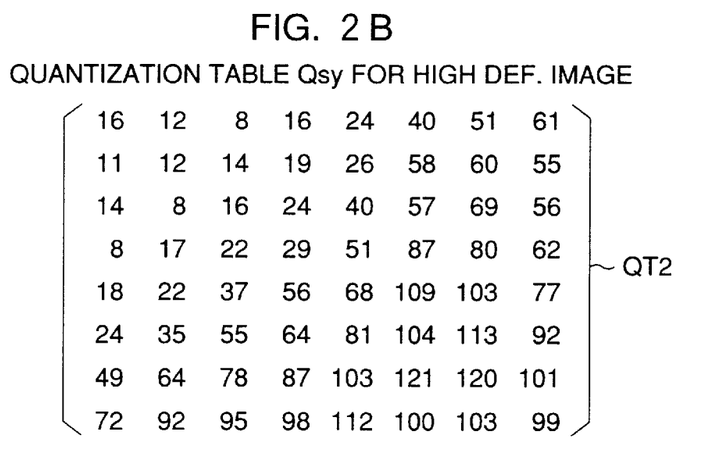
FIG. 2B is a view showing a quantization table for a high definition image.
Figure 2C:
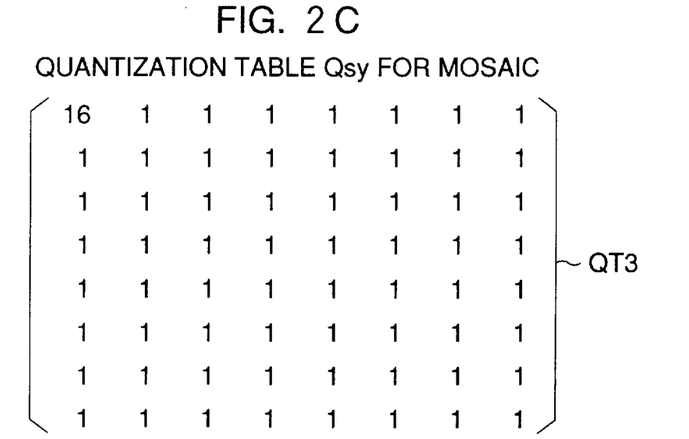
FIG. 2C is a view showing a quantization table for a mosaic-processed image.

FIGS. 2A, 2B and 2C show examples of a quantization table used for quantizing or dequantizing the luminance data Y. Reference QT1 shows a default quantization table Qy. Reference QT2 shows a quantization table Qsy used for quantizing or dequantizing a high definition image. Reference QT3 shows a quantization table Qsy which is used for a mosaic-process.

The two-dimensional DCT performed in the DCT processing unit 11 and the quantization performed in the quantization processing units 12 and 14 are described below.

The luminance data Y and the color difference data Cb and Cr, regarding a single frame image, are divided into a plurality of blocks which are processed separately. Note that each of the blocks is composed of pixel data arranged in an 8×8 matrix.

Figure 3:
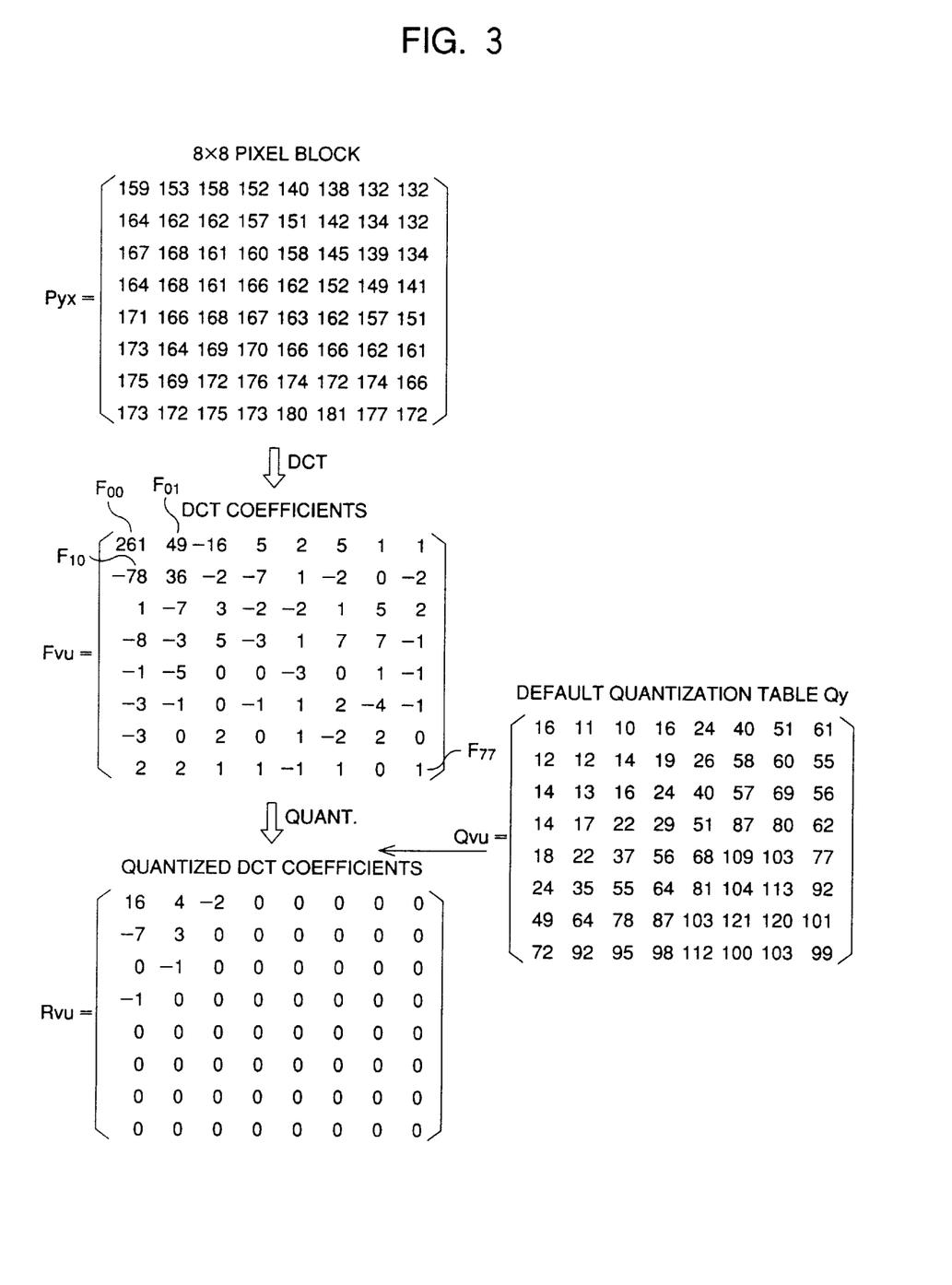
FIG. 3 is a view showing an example of image data Pyx, DCT coefficients Fvu, quantized DC coefficients Rvu and a default quantization table Qvu.

FIG. 3 shows, as an example, pixel values Pyx of an 8×8 pixel block, DCT coefficients Fvu, quantized DCT coefficients Rvu and a default quantization table Qy. Suffix "y" indicates a vertical position in the 8×8 pixel block. Values of "y" (0, 1, 2, . . . 7) ascend from an upper-position to a lower-position. Suffix x indicates a horizontal position in the 8×8 pixel block. Values of "x" (0, 1, 2, . . . 7) ascend from a left-position to a right-position. Suffixes "v" and "u" correspond to vertical and horizontal positions of 64 DCT coefficients which are arranged in an 8×8 matrix. Values of "v" (0, 1, 2, . . . 7) ascend from the upper-position to the lower-position. Values of "u" (0, 1, 2, . . . 7) ascend from the left-position to the right-position.

The pixel values Pyx are converted to 64 (8×8) DCT coefficients Fvu by the two-dimensional DCT. The two-dimensional DCT is expressed by the following equation (1):

$$Fvu = \frac{1}{4} Cu Cv \sum_{y=0}^{7} \sum_{x=0}^{7} Pyx \cdot \cos\frac{(2x+1)u\pi}{16} \cdot \cos\frac{(2y+1)v\pi}{16} \quad (1)$$

$$\text{wherein } Cu, Cv = \frac{1}{\sqrt{2}} : u, v = 0$$

$$= 1 : u, v \neq 0$$

Of these DCT coefficients, the DCT coefficient $F_{00}$ at the position (0,0) is the DC (Direct Current) component, while the remaining 63 DCT coefficients Fvu are the AC (Alternating Current) components. The AC components show how many higher spatial frequency components there are in the 8×8 pixel block of image data from coefficients $F_{01}$ and $F_{10}$ to coefficient $F_{77}$. The DC component shows a average value of the spatial frequency components of 8×8 pixel block as a whole. Each DCT coefficient Fvu corresponds to a predetermined spatial frequency.

The quantization table Qy is composed of 64 quantization coefficients Qvu. The equation for quantization of the DCT coefficients Fvu, using the quantization table Q1, is defined as follows:

Rvu=round (Fvu/Qvu) (0≦u, v≦7)

The term "round", in this equation, is an approximation function which approximates, to the nearest integer, the value of the argument. Thus, if the argument is less than 0.5, the value is rounded down to the nearest integer. If the argument is greater than or equal to 0.5, the value is rounded up to the nearest integer. For example, the value 3.49 is rounded down to 3, whereas 3.50 is rounded up to 4. Namely, the quantized DCT coefficients Rvu, shown in FIG. 3, are obtained by dividing each of the DCT coefficients Fvu by the corresponding quantization coefficients Qvu, and rounding off.

In this way, the quantized DCT coefficients Rvu, obtained in the quantization processing unit 12, are inputted to the compression processing unit 13. Since the Huffman encoding, performed in the compression processing unit 13, is well known, a detailed explanation thereof is omitted in this specification.

Figure 4:
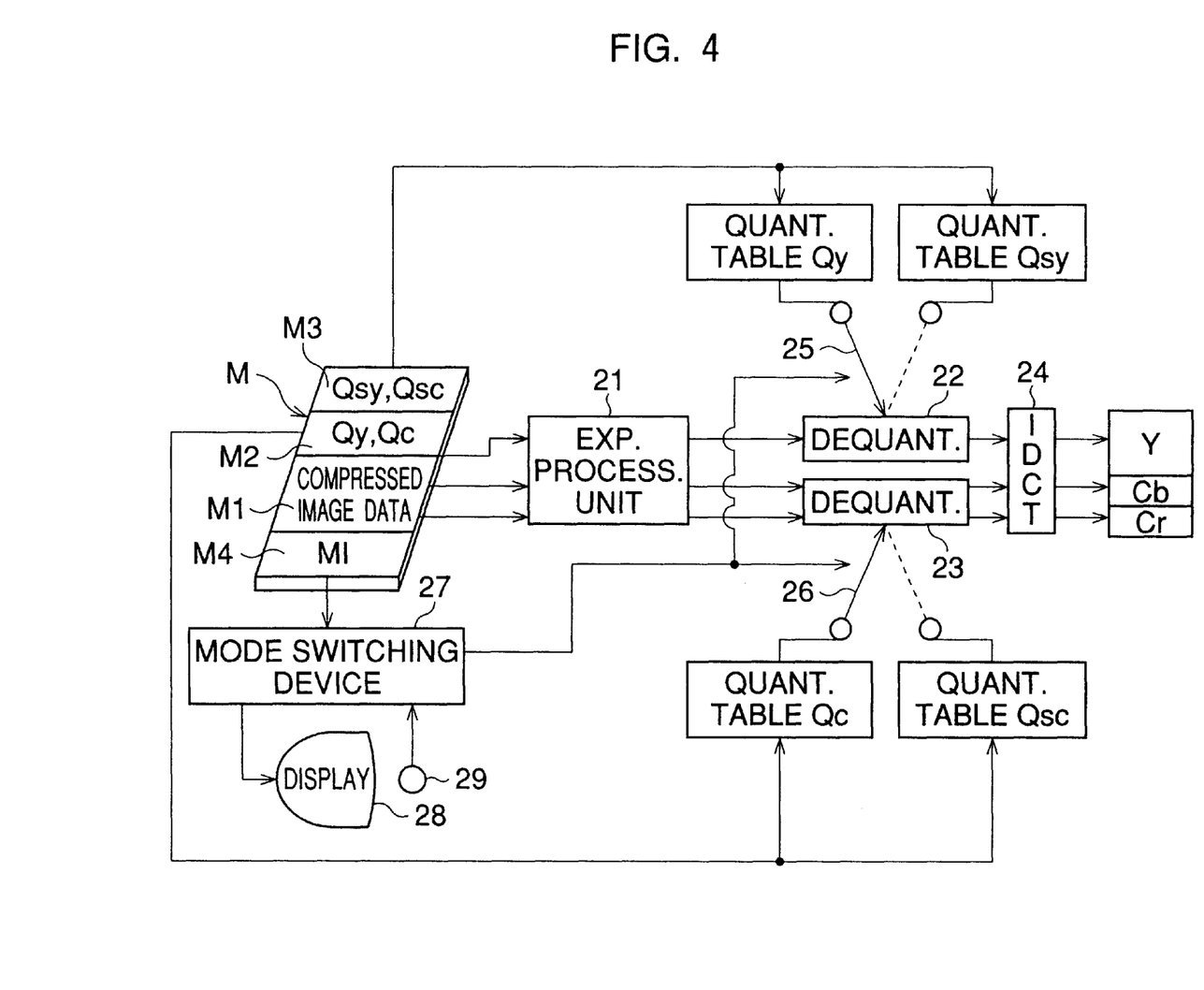
FIG. 4 is a block diagram showing an image expansion device of the embodiment.

FIG. 4 is a block diagram of an image expansion device of the embodiment of the present invention.

The compressed image data, corresponding to the Y data, the Cb data and the Cr data, read from the recording medium M are decoded, in an expansion processing unit 21, and are converted to the quantized DCT coefficients. The decoding is the inverse of the Huffman encoding, which is well known. The quantized DCT coefficients, obtained by the decoding, are dequantized, in a dequantization processing unit 22 for the luminance signal or a dequantization processing unit 23 for the color difference signal, using the quantization tables Cy and Qc (or Qsy and Qsc), respectively, so that the quantized DCT coefficients are converted back to the DCT coefficients. These DCT coefficients are then subjected to a two-dimensional IDCT, in an IDCT processing unit 24, so that the luminance data Y and the color difference data Cb and Cr are reproduced.

The default (or the first) quantization tables Qy and Qc and the second quantization tables Qsy and Qcy are stored, respectively, in the first table recording area M2 and in the second table recording area M3, of the recording medium M. The default quantization tables Qy and Qc or the second quantization tables Qsy and Qcy are used in the dequantization processing units 22 and 23 in accordance with the operation of switches 25 and 26.

The quantization tables Qy and Qsy, for the luminance data, are inputted into the dequantization processing unit 22 through the switch 25. The quantization tables Qc and Qsc, for the color difference data, are inputted into the dequantization processing unit 23 through switch 26. The switches 25 and 26 are operated in accordance with a switch command signal outputted by a mode switching device 27. A display device 28 and a selecting button 29 are connected to the mode switching device 27. Based on the mode information MI, read from the information recording area M4 of the recording medium M, an indication, implying that the default quantization tables Qy and Qc and the second quantization tables Qsy and Qsc can be selected, is registered on the display device 28. By operating the selecting button 29 in accordance with the indication, the switches 25 and 26 are operated.

When switches 25 and 26 are set to the positions shown by the solid lines in FIG. 4, the dequantization processes are performed using the default quantization tables Qy and Qc in the dequantization processing units 22 and 23. Conversely, when switches 25 and 26 are set to the positions shown by the broken lines in FIG. 4, the dequantization processes are performed using the second quantization tables Qsy and Qsc in the dequantization processing units 22 and 23.

Figure 5:
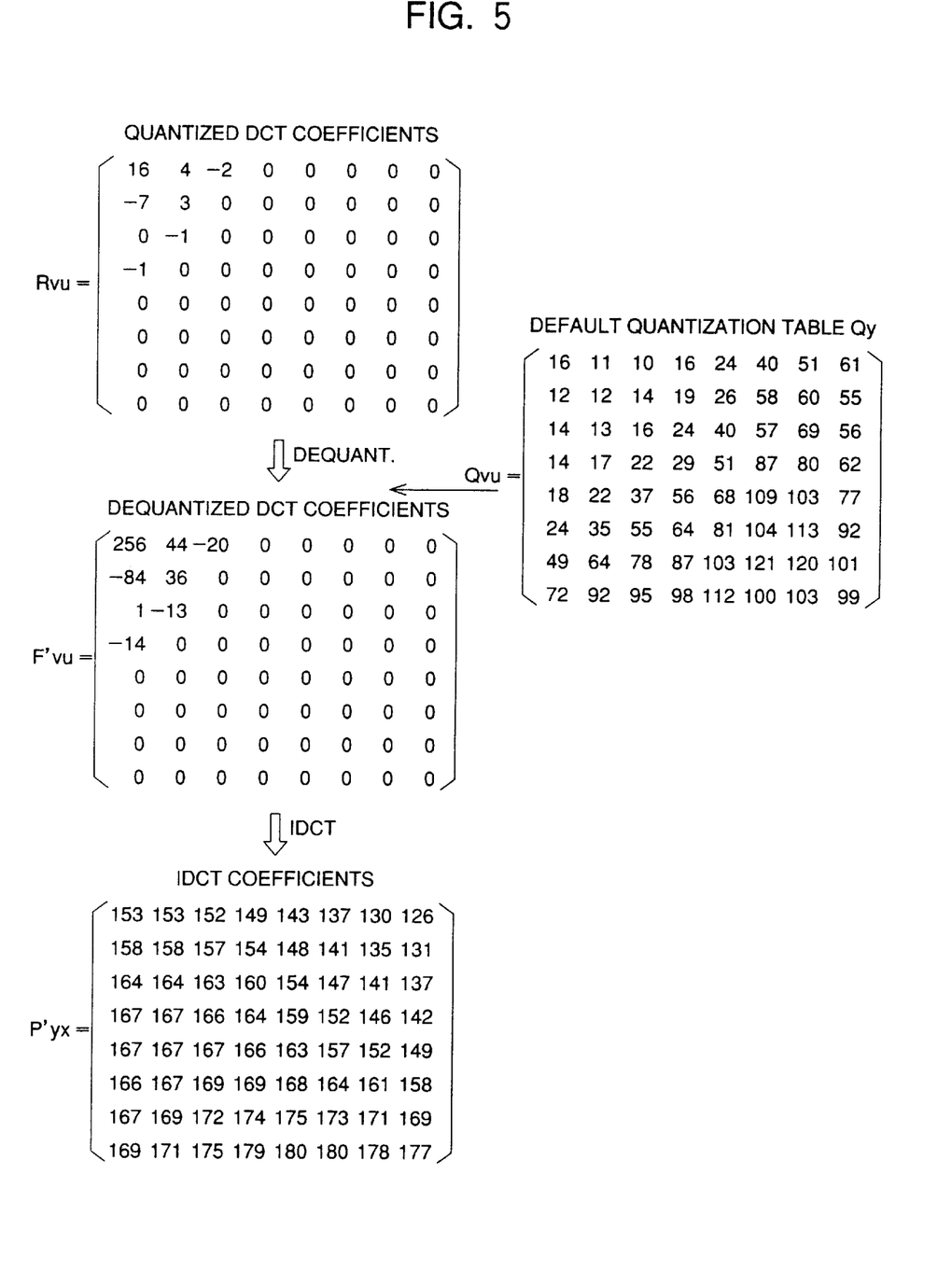
FIG. 5 is a view showing an example of quantized DCT coefficients Rvu obtained by an expansion processing unit, dequantized DCT coefficients F'vu obtained by a dequantization processing unit and IDCT coefficients P'yx obtained by an IDCT processing unit.

FIG. 5 shows an example of quantized DCT coefficients Rvu obtained by the expansion processing unit 21, dequantized DCT coefficients Flvu obtained by the dequantization processing unit 22, and IDCT coefficients P'yx obtained by the IDCT processing unit 24. This example shows that the quantized DCT coefficients Rvu are dequantized using the default quantization table Qy.

Namely, the quantized DCT coefficients Rvu are dequantized by being multiplied by the corresponding quantization coefficients Qvu, included in the default quantization table Qy, so that the quantized DCT coefficients Rvu are converted to dequantized DCT coefficients F'vu. The dequantized DCT coefficients F'vu correspond to the DCT coefficients Fvu shown in FIG. 3. The dequantized DCT coefficients F'vu are subjected to the two-dimensional IDCT process, in the IDCT processing unit 24, and are converted to IDCT coefficients P'yx, which correspond to the pixel values Pyx shown in FIG. 3.

Figure 6:
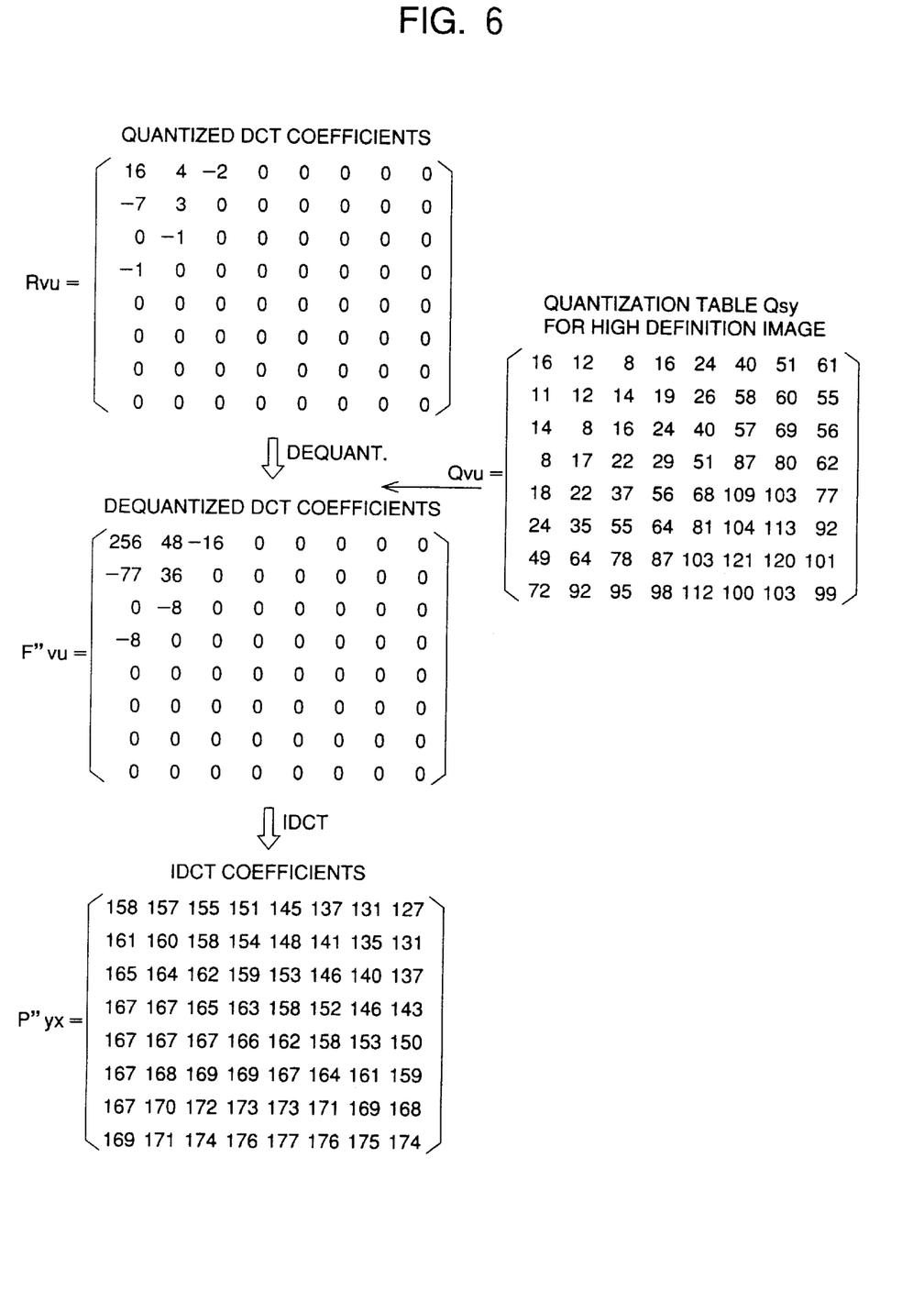
FIG. 6 is a view showing an example in which quantized DCT coefficients Rvu, obtained by the expansion processing unit, are dequantized using a quantization table Qsy for a high definition image.

FIG. 6 shows an example in which quantized DCT coefficients Rvu, obtained by the expansion processing unit 21, are dequantized using the quantization table Qsy for a high definition image. In comparison with a case in which the default quantization table Qy is used, each value of the dequantized DCT coefficients F''vu and each value of the IDCT coefficients P''yx are different to those shown in the related parts of FIG. 3, and the IDCT coefficients P''yx are composed of pixel values corresponding to a high definition image.

Figure 7:
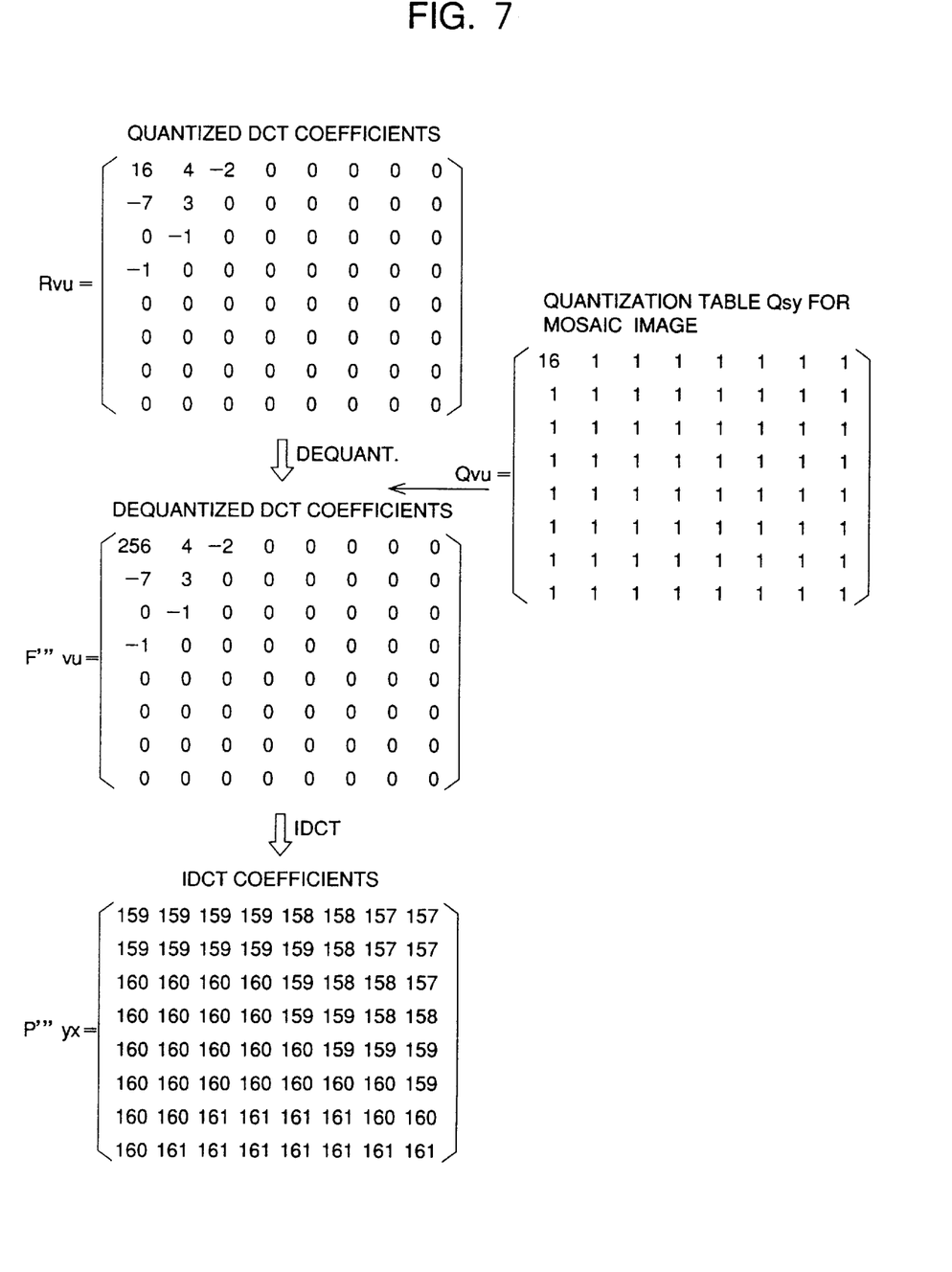
FIG. 7 is a view showing an example in which quantized DCT coefficients Rvu, obtained by the expansion processing unit, are dequantized using the quantization table Qsy for a mosaic-process.

FIG. 7 shows an example in which quantized DCT coefficients Rvu, obtained by the expansion processing unit 21, are dequantized using the quantization table Qsy for a mosaic-process. In comparison with a case in which the default quantization table Qy and the quantization table Qsy for a high definition image are used, each value of the dequantized DCT coefficients F'''vu and each value of the IDCT coefficients P'''yx are, again, different, and the IDCT coefficients P'''yx are composed of pixel values corresponding to a mosaic image.

Figure 8:
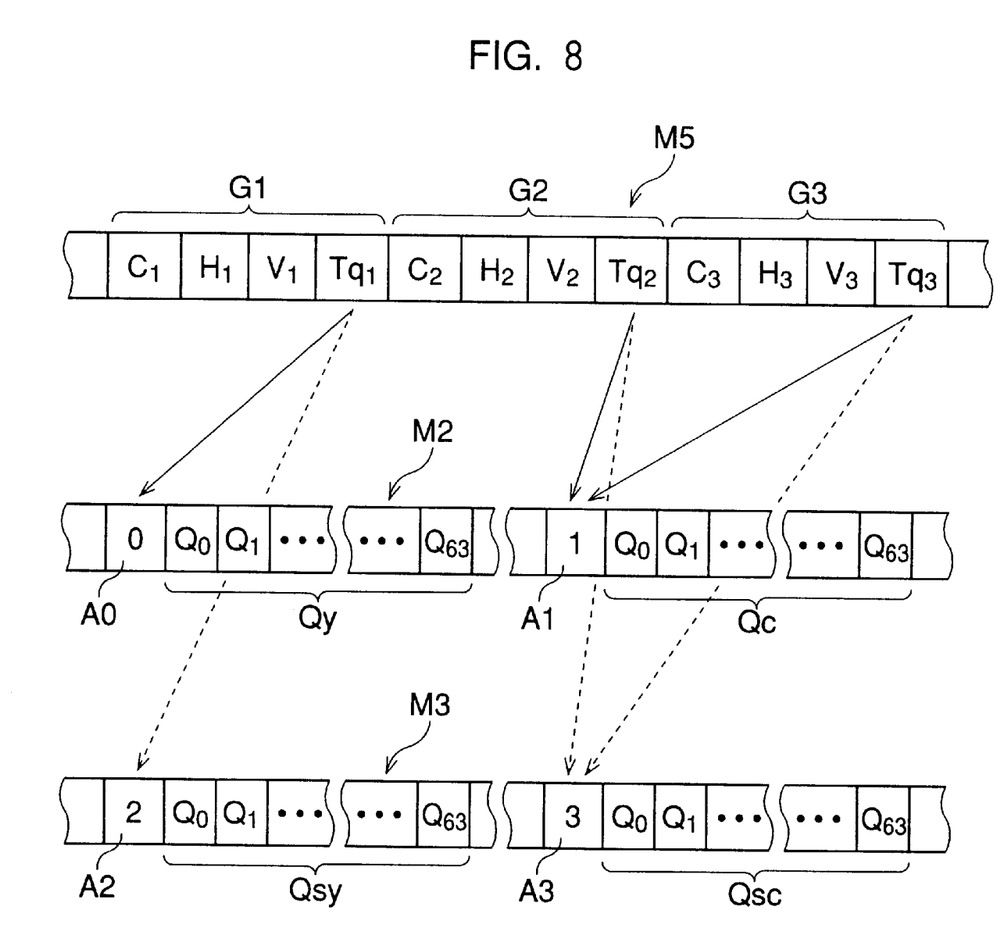
FIG. 8 is a view showing a construction of a first table recording area, a second table recording area and a parameter recording area provided in a recording medium.

FIG. 8 shows a construction of the first table recording area M2, the second table recording area M3 and a parameter recording area M5, provided in the recording medium M.

The parameter recording area M5 is composed of a first group G1, a second group G2 and a third group G3. Component recognition information $C_1$ means that a parameter regarding the luminance data Y is stored in the first group G1. $H_1$ represents a horizontal sampling factor and $V_1$ represents a vertical sampling factor. These sampling factors $H_1$ and $V_1$ are determined according to a recommendation by the JPEG. $Tq_1$ indicates quantization table selection information, the selection information being a value of a quantization table number which corresponds to the first table recording area M2 or the second table recording area M3, in which the quantization table regarding the luminance data Y is stored.

Similarly, component recognition information $C_2$ means that a parameter regarding the color difference data Cb is stored in the second group G2. $H_2$ represents a horizontal sampling factor and $V_2$ represents a vertical sampling factor. These sampling factors $H_2$ and $V_2$ are determined according to a recommendation by the JPEG. $Tq_2$ is quantization table selection information regarding the color difference data Cb. Component recognition information $C_3$ means that a parameter regarding the color difference data Cr is stored in the third group G3. $H_3$ represents a horizontal sampling factor and $V_3$ indicates a vertical sampling factor. These sampling factors $H_3$ and $V_3$ are determined according to a recommendation by the JPEG. $Tq_3$ is quantization table selection information regarding the color difference data Cr.

As described above, the first recording area M2 is provided for recording the default quantization tables Qy and Qc and the second recording area M3 is provided for recording the second quantization tables Qsy and Qsc.

Regarding the default quantization tables Qy and Qc, a first quantization table number of "0" (reference is A0 in FIG. 8) is stored in an address of $Tq_1$ as first quantization table selection information, and 64 quantization coefficients $Q_0, Q_1, \ldots Q_{63}$ forming the quantization table Qy, used for quantizing the luminance data Y, are stored in the addresses following the first quantization table number. Second quantization table numbers of "1" (reference is A1 in FIG. 8) are stored in addresses of $Tq_2$ and $Tq_3$, as second quantization table, where $Tq_2$ and $Tq_3$ have identical addresses, and 64 quantization coefficients $Q_0, Q_1, \ldots Q_{63}$ forming the quantization table Qc, used for quantizing the color difference data Cb and Cr, are stored in the addresses following the second quantization table numbers.

Regarding the second quantization tables Qsy and Qsc for a high definition image or a mosaic process, a third quantization table number of "2" (reference is A2 in FIG. 8) is stored in an address of $Tq_1$ as third quantization table selection information, and 64 quantization coefficients $Q_0, Q_1, \ldots Q_{63}$ forming the quantization table Qsy, used for quantizing the luminance data Y, are stored in the addresses following the third quantization table number. Fourth quantization table numbers of "3" (reference is A3 in FIG. 8) are stored in addresses of $Tq_2$ and $Tq_3$ as fourth quantization table selection information, where the addresses of $Tq_2$ and $Tq_3$ are identical, and 64 quantization coefficients $Q_0, Q_1, \ldots Q_{63}$ forming the quantization table Qsc used for quantizing the color difference data Cb and Cr, are stored in the addresses following the fourth quantization table numbers.

Therefore, by setting each selection information ($Tq_1, Tq_2$ and $Tq_3$) to an integer value of one of 0 through 3, corresponding to the required quantization table and, thereby, to the operations of the switches 25 and 26 shown in FIG. 4, the predetermined quantization tables Qy, Qc, Qsy and Qsc are selected.

Figure 9:
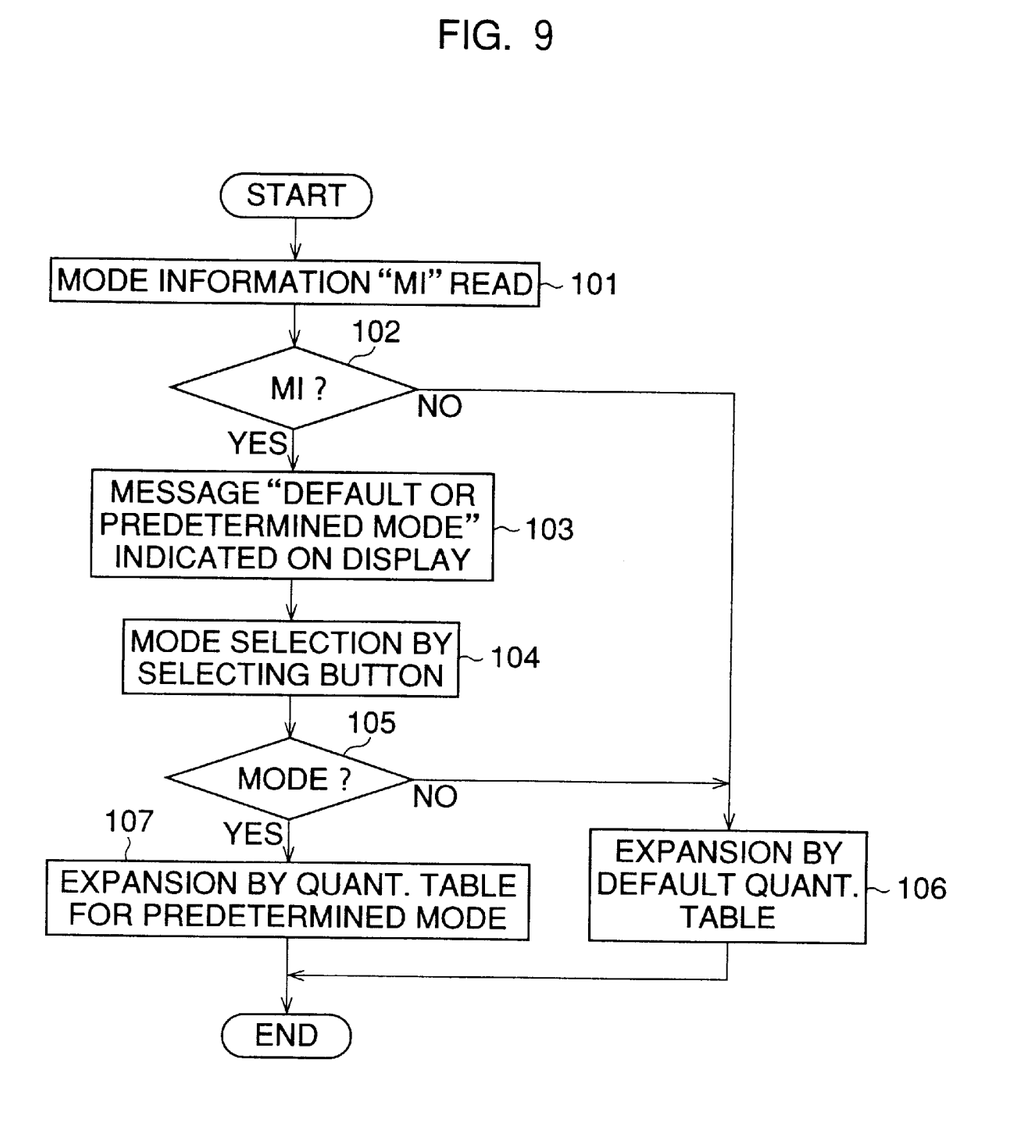
FIG. 9 is a flow chart showing an image expansion process.

FIG. 9 is a flow chart showing an image expansion process.

In Step 101, data stored in the information recording area M4 of the recording medium M are read out. In Step 102, it is determined, based on the data, whether mode information MI is stored. When mode information MI is stored, Step 103 is executed so that a message implying "whether the default quantization table is used or a quantization table of a predetermined mode is used" is indicated by the display device 28. The predetermined mode means, for example, a mode by which a high definition image is reproduced or a mode by which an image subjected to a mosaic-process is reproduced.

In Step 104, the selecting button 29 is operated, so that a mode of the image expansion process is selected. When a predetermined mode (a high definition image mode, for example) is selected by the selecting button 29, the expansion process is performed using the quantization tables Qsy and Qsc in Step 107, and then, this image expansion process program ends. Conversely, when the predetermined mode is not selected by the selecting button 29 and, also, when it is determined in Step 102 that mode information MI is not stored, Step 106 is executed so that the expansion process is performed using the default quantization tables Qy and Qc.

As described above, according to the embodiment, when the default quantization tables Qy and Qc are used in the image expansion process, the original image, which is not subjected to a process such as a mosaic process, can be reproduced. Therefore, even if image data recorded in the recording medium M is subjected to the expansion process by a conventional expansion device, a usual expansion process can be performed.

Further, according to the embodiment, by using the quantization tables Qsy and Qsc for a high definition image or a mosaic process, which are stored in the recording medium M, a high definition image or a mosaic-processed image can be reproduced. Namely, an image subjected to various kind of processes can be obtained without using a special process.

Note that four quantization tables, at most, can be stored in the recording medium M, in this embodiment. Therefore, besides the default quantization tables Qy and Qc, at any one time, only one other kind of quantization table can be stored in the recording medium M as the second quantization tables Qsy and Qsc. For example, only the quantization tables for a high definition image can be stored in the recording medium M in the embodiment.

Further note that, as a method of image compression, an image compression other than the JPEG algorithm can be applied.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-247254 (filed on Aug. 29, 1996) which is expressly incorporated herein by by reference, in its entirety.

I claim:

1. An image compression device, comprising:
   a two-dimensional discrete cosine transformation (two-dimensional DCT) processor that processes original image data to obtain a DCT coefficient for each spatial frequency;
   first and second quantization tables composed of predetermined quantization coefficients to obtain quantized DCT coefficients, said first quantization table being different from said second quantization table;
   a quantization processor that quantizes said DCT coefficients by said first quantization table independent of the nature of said original image data;
   an encoding processor that encodes said quantized DCT coefficients to obtain compressed image data;
   a recording processor that records said compressed image data in an image recording area of a recording medium;
   a first table recording processor that records said first quantization table in a first table recording area of said recording medium;
   a second table recording processor that records said second quantization table, in a second table recording area of said recording medium; and
   an information recording processor that records mode information implying that said second quantization table is recorded in said recording medium, in an information recording area of said recording medium.

2. A device according to claim 1, wherein said original image data comprises pixel values arranged in a matrix.

3. A device according to claim 1, wherein said original image data corresponds to a still image.

4. A device according to claim 1, wherein said second quantization table comprises quantization coefficients for expanding said compressed image data as a high definition image.

5. A device according to claim 1, wherein said second quantization table comprises quantization coefficients for expanding said compressed image data as a mosaic-processed image.

6. An image expansion device which expands compressed image data recorded in a recording medium, in which a first quantization table and a second quantization table are also recorded, said image expansion device comprising:
   a decoding processor that decodes said compressed image data to obtain quantized DCT coefficients;
   a table selecting processor that selects one of said first quantization table and said second quantization table;
   a dequantization processor that dequantizes said quantized DCT coefficients, using said one of said first quantization table and said second quantization table selected by said table selecting processor to obtain DCT coefficients; and
   a two dimensional inverse discrete cosine transformation (two-dimensional IDCT) processor that processes said DCT coefficients to produce image data based on said compressed image data.

7. A device according to claim 6, wherein said recording medium stores mode information implying that said second quantization table is recorded in said recording medium, said table selecting processor selecting one of said first quantization table and said second quantization table when said mode information is recorded in said recording medium, and selecting said first quantization table when said mode information is not recorded in said recording medium.

8. A device according to claim 7, further comprising an indicating processor that indicates that said one of said first quantization table and said second quantization table can be selected, when said mode information is recorded in said recording medium.

9. The device of claim 6, wherein said table selecting processor selects said one of said first quantization table and said second quantization table based on criteria that is independent from said quantized DCT coefficients.

10. The device of claim 6, wherein said table selecting processor selects said one of said first quantization table and said second quantization table based on manual selection by a user.

11. An image compression and expansion device, comprising:
   a two dimensional discrete cosine transformation (two-dimensional DCT) processor that processes original image data to obtain a DCT coefficient for each spatial frequency;
   a quantization processor that quantizes said DCT coefficients by a first quantization table composed of predetermined quantization coefficients to obtain quantized DCT coefficients;
   an encoding processor that encodes said quantized DCT coefficients to obtain compressed image data;
   a recording processor that records said compressed image data in an image recording area of a recording medium;
   a first table recording processor that records said first quantization table in a first table recording area of said recording medium;
   a second table recording processor that records a second quantization table, different from said first quantization table, in a second table recording area of said recording medium;
   an information recording processor that records mode information, implying that said second quantization table is recorded in said recording medium, in an information recording area of said recording medium;
   a decoding processor that decodes said compressed image data to reproduce said quantized DCT coefficients;
   a table selecting processor that selects one of said first quantization table and said second quantization table;

a dequantization processor that dequantizes said quantized DCT coefficients, using said one of said first quantization table and said second quantization table selected by said table selecting processor, to reproduce said DCT coefficients; and a two dimensional inverse discrete cosine transformation (two-dimensional IDCT) processor that processes said DCT coefficients to produce image data based on said compressed image data.

12. The device of claim 11, wherein said table selecting processor selects said one of said first quantization table and said second quantization table based on criteria that is independent from said quantized DCT coefficients.

13. The device of claim 11, wherein said table selecting processor selects said one of said first quantization table and said second quantization table based on manual selection by a user.

* * * * *